United States Patent
Lee et al.

(10) Patent No.: US 6,667,457 B1
(45) Date of Patent: Dec. 23, 2003

(54) SYSTEM AND METHOD FOR A SACRIFICIAL ANODE IN A KERF FOR CORROSION PROTECTION DURING SLIDER FABRICATION

(75) Inventors: Edward Hin Pong Lee, San Jose, CA (US); Neil Leslie Robertson, Palo Alto, CA (US); Edward Dinan Thomas, San Jose, CA (US)

(73) Assignee: Hitachi Global Storage Technologies, Amsterdam (NL)

( * ) Notice: Subject to any disclaimer, the term of this patent is extended or adjusted under 35 U.S.C. 154(b) by 0 days.

(21) Appl. No.: 10/245,051

(22) Filed: Sep. 17, 2002

(51) Int. Cl.[7] ............................................. B23K 26/38
(52) U.S. Cl. .............................................. 219/121.69
(58) Field of Search ....................... 360/234.5, 235.2, 360/235.1, 122, 128, 234.7; 219/121.65, 121.66, 121.67, 121.68, 121.69, 121.7, 121.71, 121.72; 216/65

(56) References Cited

U.S. PATENT DOCUMENTS

| | | | |
|---|---|---|---|
| 3,855,625 A | * 12/1974 | Garnier et al. | 360/235.6 |
| 4,130,847 A | 12/1978 | Head et al. | 360/122 |
| 4,467,382 A | 8/1984 | Huisman | 360/125 |
| 4,835,361 A | * 5/1989 | Strom | 219/121.85 |
| 5,023,738 A | 6/1991 | Prenosil | 360/122 |
| 6,034,349 A | * 3/2000 | Ota | 219/121.73 |
| 6,049,056 A | * 4/2000 | Balamane et al. | 219/121.66 |
| 6,059,984 A | 5/2000 | Cohen et al. | 216/22 |
| 6,255,621 B1 | 7/2001 | Lundquist et al. | 219/121.72 |

FOREIGN PATENT DOCUMENTS

| | | | |
|---|---|---|---|
| JP | 1102710 | 4/1989 | G11B/5/31 |
| JP | 2089210 | 3/1990 | G11B/5/52 |
| JP | 3181009 | 8/1991 | G11B/5/31 |
| JP | 7282410 | 10/1995 | G11B/5/127 |

OTHER PUBLICATIONS

Andricacos et al., "Inductive Recording Head Design for Electrochemical Potential Control", Sep. 1992, Yorktown.

* cited by examiner

Primary Examiner—Kiley Stoner
Assistant Examiner—Jonathan Johnson
(74) Attorney, Agent, or Firm—Silicon Valley IP Group, PC; Dominic M. Kotab

(57) ABSTRACT

A slider fabrication assembly and method for making the same are provided. A slider is formed on a substrate. A corrodible component of the slider is exposed to an environment in contact with the slider. A kerf region of the substrate is positioned adjacent to the slider. The kerf region is removable from the slider. A sacrificial anode is embedded in the kerf region and exposed to the environment. The sacrificial anode is electrically coupled to the corrodible component of the slider thereby forming an electrochemical cell. The sacrificial anode is less noble, i.e., more corrodible, than the corrodible slider component, and thus corrodes first. When the kerf region is removed, the corroded sacrificial anode is removed as well.

11 Claims, 4 Drawing Sheets

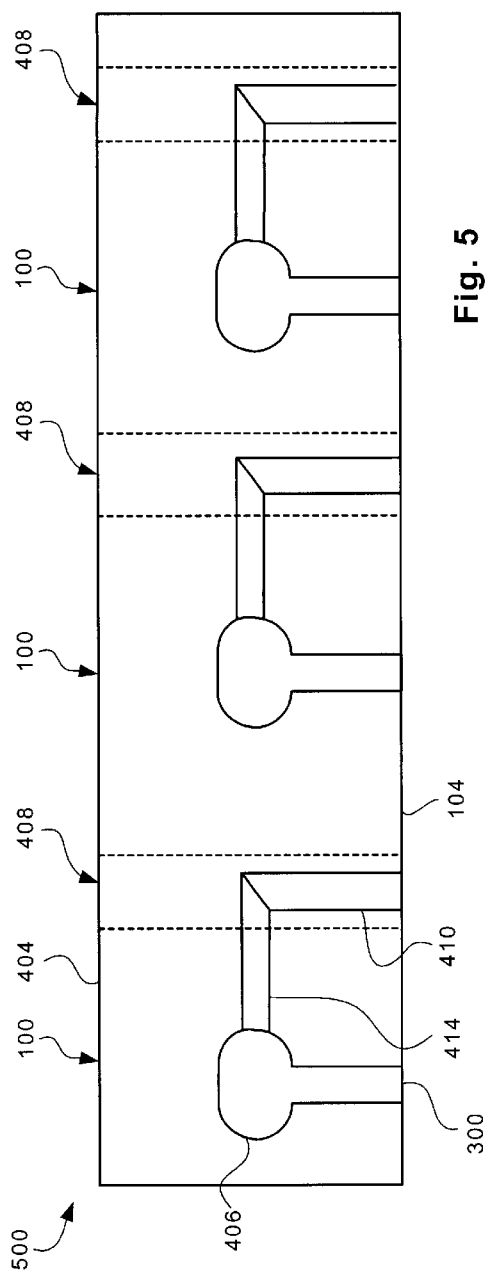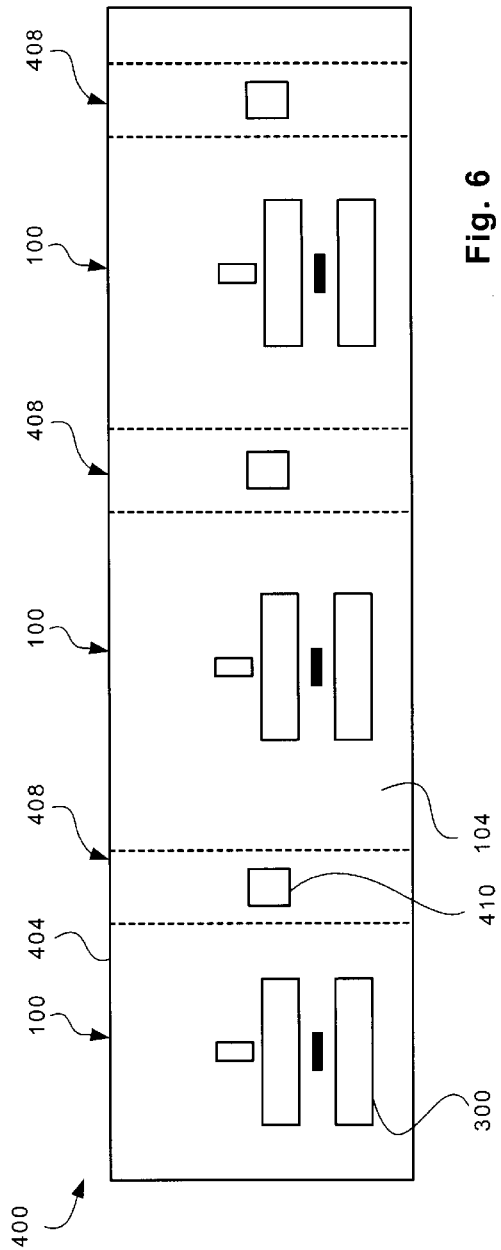

SYSTEM AND METHOD FOR A SACRIFICIAL ANODE IN A KERF FOR CORROSION PROTECTION DURING SLIDER FABRICATION

FIELD OF THE INVENTION

The present invention relates to magnetic head fabrication, and more particularly, this invention relates to a sacrificial anode in a kerf region adjacent a slider on a substrate for reducing corrosion of exposed magnetic surfaces of the slider.

BACKGROUND OF THE INVENTION

Magnetic metal alloys such as permalloy are commonly used as one of the materials for forming magnetic head assemblies used in computer data storage devices. It is known in the art that the magnetic surfaces of magnetic head assemblies are attacked by moisture and chemicals causing corrosion, which reduces the reliability and accuracy of the head, and can lead to total disk drive failure.

Permalloy is a magnetic nickel-iron alloy which has excellent magnetic properties, but which is subject to corrosion. In particular, water, chlorides and sulfides are known to corrode permalloy. Other magnetic alloys are also susceptible to corrosion. Corrosion commonly occurs during the slider fabrication process on the wafer, which involves much water processing.

Magnetic head assemblies typically include a plurality of exposed magnetic surfaces, such as pole tips at or on the air bearing surface of the "flying head" assembly, for example. The air bearing surfaces for purposes of this disclosure are the surfaces of the magnetic head which contact the magnetic recording media when the magnetic recording media is not in motion. Frictional contact between the magnetic portions of the air bearing surfaces generated during starting and stopping prevents further corrosion.

Although it is known in the art generally that the air bearing surface of a magnetic head can be coated with a layer of anticorrosive material, this layer is not added until after slider fabrication and therefore does not prevent corrosion that occurs between the end of the wafer process and the placing of the layer of anticorrosive material on the head.

One prior art method of preventing corrosion during slider fabrication is the placement of a corrodible anode in the head assembly. The corrodible anode is constructed of a material having an ionization tendency larger than that of the magnetic material, and therefore will sacrificially corrode in place of the material to be protected. The material corrodes instead of protected material by providing a potential to the protected material.

For example, Japanese patent JP1102710A, Apr. 20, 1989 to Goto Hirochi et al. embeds a thin film corrodible anode in the head structure. The corrodible anode is in contact with magnetic thin films.

However, in prior art methods using corrodible anodes, the corrodible anode remains in the head after processing. As the anode corrodes, it creates corrosion products that remain in the head and which end up in the finished disk drive. The head can run into this debris, resulting in errors.

Another prior art method suggests use of a power supply to provide corrosion protection. However, the user of a power supply is not possible given the grounding requirements for other structures in the disk drive.

The above-mentioned prior art methods fail to disclose a method of protecting the magnetic surfaces of a magnetic head during the slider fabrication process for magnetic recording head assemblies. A corrodible anode which does not remain in the head structure after manufacture, significantly reduces corrosion, does not distort the signal generated by the magnetic recording head, and does not increase the potential for catastrophic hard disk failure would therefore be very desirable.

DISCLOSURE OF THE INVENTION

A slider fabrication assembly is provided according to one embodiment. A slider is formed on a substrate. A corrodible component of the slider such as a read element and/or a write element is exposed to an environment (chemicals, water, air, etc.) in contact with the slider. A kerf region of the substrate is positioned adjacent to the slider. The kerf region is removable from the slider and is removed during some stage of fabrication of the slider such as when slicing the slider from a row of sliders. A sacrificial anode is embedded in the kerf region and exposed to the environment, preferably on the air bearing surface side of the slider. The sacrificial anode is electrically coupled to the component of the slider thereby forming an electrochemical cell. The sacrificial anode is less noble, i.e., more easily corrodible, than the corrodible component of the slider, and thus corrodes first. When the kerf region is removed, the corroded sacrificial anode is removed as well. Thus, the sacrificial node can protect the corrodible slider components during processing, but will not create debris in the disk drive since it is removed with the kerf region.

The sacrificial anode is preferably constructed at least in part of aluminum, zinc, manganese, and/or magnesium, or an alloy of one or more of them. In one embodiment, a connector of a material different than the sacrificial anode couples the sacrificial anode to the component of the slider.

If multiple sliders are being constructed, the kerf region may be defined between aligned sliders. The sacrificial anode is removed with the kerf region during separation of the sliders. The kerf region can be removed via sawing and/or laser cutting.

A method for fabricating a plurality of sliders is also provided. First portions of the sliders are created on a substrate. Each first portion includes a corrodible component. Kerf regions are defined between the sliders. Sacrificial anodes are added to the kerf regions. The sacrificial anodes are exposed to an environment in contact with the sliders (at least after lapping the rows to define air bearing surfaces). Again, the sacrificial anodes are preferably constructed at least in part of aluminum, zinc, manganese, magnesium or an alloy thereof. The sacrificial anodes are connected to the components of the sliders. A remainder of each slider is constructed. The sliders are exposed to a substance that may be corrosive. The substrate is diced into rows. The rows are lapped to define air bearing surfaces. Air bearing surfaces are patterned on the rows. A protective layer is added to each of the sliders to prevent further corrosion and provide wear resistance. Preferably, the protective layer is a carbon-based layer. The kerf regions are removed such as by sawing and/or laser cutting for slicing the sliders from the rows. The sacrificial anodes are removed with the kerf regions.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

FIG. 5 is a side view of a slider fabrication assembly according to an alternate embodiment.

FIG. 6 is a side view of the slider fabrication assembly taken along line 6—6 of FIG. 4.

BEST MODE FOR CARRYING OUT THE INVENTION

The following description is the best embodiment presently contemplated for carrying out the present invention. This description is made for the purpose of illustrating the general principles of the present invention and is not meant to limit the inventive concepts claimed herein.

The present invention protects magnetic heads from failures due to residual corrosion debris left over from the slider fabrication process. As the damage due to environmental corrosion primarily occurs during fabrication of the sliders, a magnetic slider assembly according to one embodiment is protected from corrosion primarily between the end of the wafer process and placement of a protective corrosion-inhibiting coating on the slider assembly.

Figure 1:
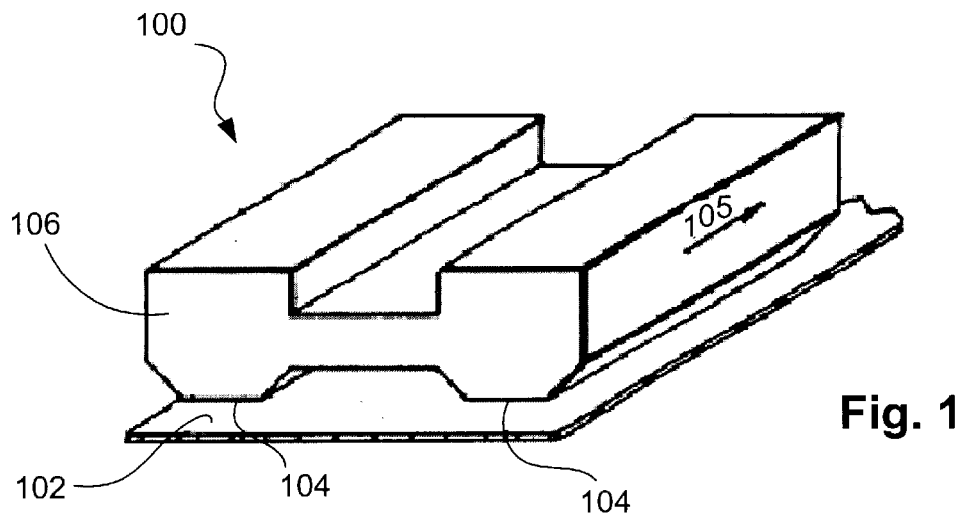
FIG. 1 illustrates a magnetic slider in combination with magnetic recording media.
Figure 2:
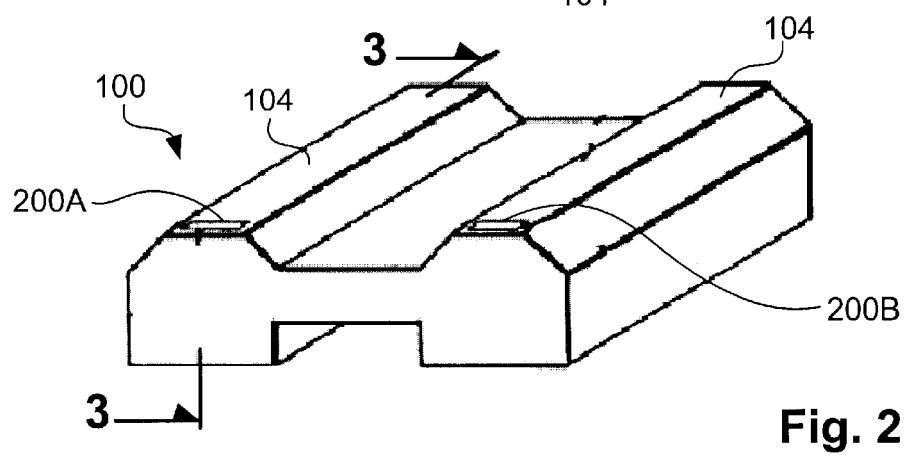
FIG. 2 shows a pair of read/write transducers mounted into the air bearing surfaces of a magnetic slider.
Figure 3:
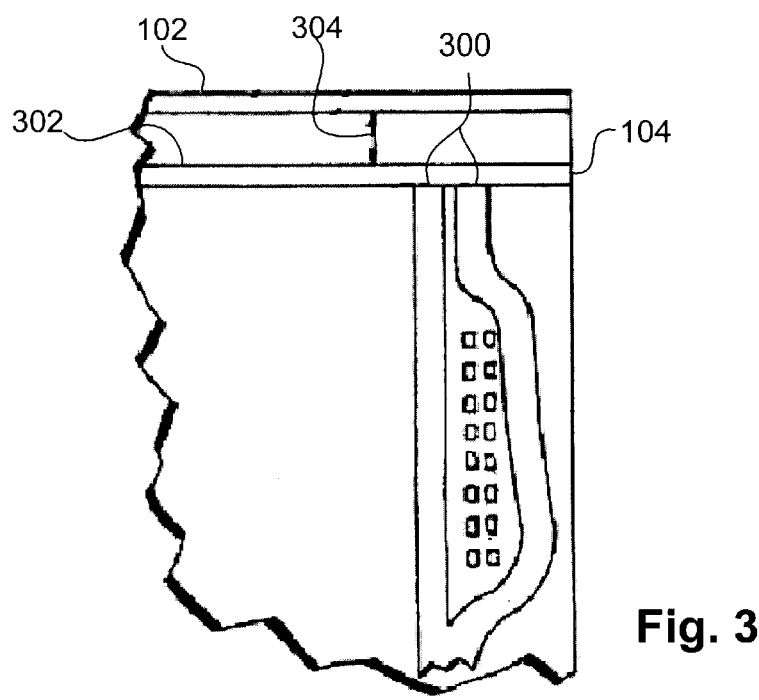
FIG. 3 shows a cross sectional view taken along line 3—3 as shown in FIG. 2, illustrating pole tips of the magnetic slider.

FIG. 1 illustrates a magnetic read/write slider 100 from a head arm assembly of a computer disk drive. The slider 100 transmits and receives information to and from the magnetic recording media 102 which moves relative to the air bearing surface 104 in the direction of the arrow 105. Near the trailing end 106 of the slider 100 and flush with the air bearing surface 104 is mounted a pair of transducers 200A, 200B (see FIG. 2), each having a plurality of pole tips 300 (see FIG. 3).

In operation (when the slider 100 and the magnetic recording media 102 are moving relative to each other) an air gap 304 is formed whose height is commonly referred to as a "fly height." The fly height is established by a self acting hydrodynamic air bearing (not shown) between the final protective coating 302 of the slider 100 and the recording media 102.

Figure 4:
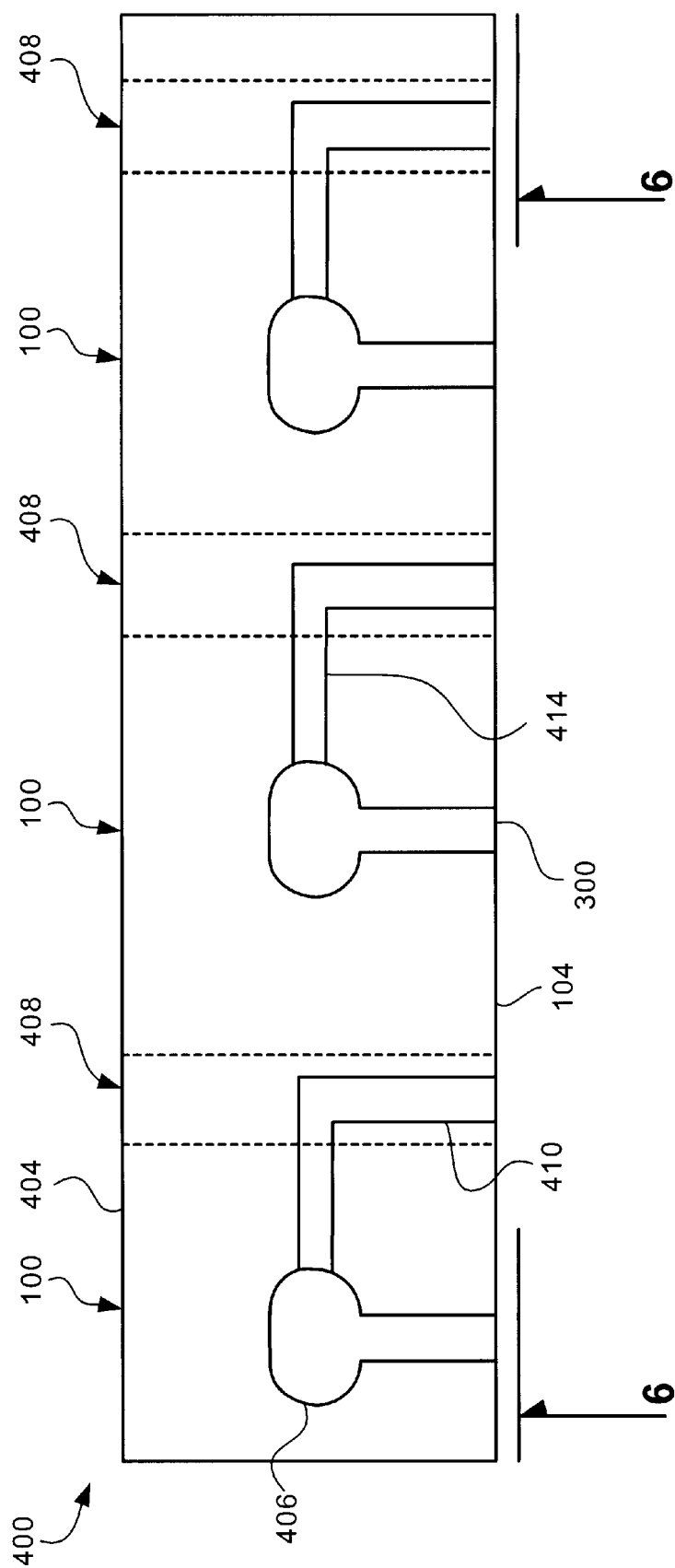
FIG. 4 is a side view of a slider fabrication assembly according to one embodiment.

FIG. 4 depicts a slider fabrication assembly 400 according to one embodiment. A plurality of sliders 100 are formed on a substrate 404. A corrodible component 406 of each slider 100 such as a pole tip 300 (see FIG. 3), read element and/or a write element that is exposed to an environment (chemicals, water, air, etc.) in contact with the sliders 100. A kerf region 408 of the substrate 404 is positioned adjacent each slider 100, and is preferably defined between the sliders 100. The kerf region 408 is removable from the substrate 404 by sawing, laser cutting, etc. A sacrificial anode 410 is embedded in each kerf region 408 and exposed to the environment, preferably on the air bearing surface side of the sliders 100 as shown in FIG. 6. The sacrificial anode 410 is less noble, i.e., more corrodible, than the corrodible component 406, and thus corrodes first. The sacrificial anode 410 is preferably constructed at least in part of aluminum, zinc, manganese, and/or magnesium, or an alloy of one or more of them.

Each sacrificial anode 410 is electrically coupled to the corrodible component 406 of the slider 100 by a connector 414, thereby forming an electrochemical cell. Each connector 414 may be an extension of the associated sacrificial anode 410. In such an embodiment, the sacrificial anode 410 preferably contains enough material to prevent corrosion of the connector 414.

FIG. 5 depicts an alternate embodiment 500 in which the connector 414 is constructed of a material different than the sacrificial anode 410. Exemplary materials that may be used for the connector 414 include Tantalum (Ta) and/or Titanium (Ti).

The sacrificial anode 410 is removed with the kerf region 408 during separation of the sliders 100. When the kerf region 408 is removed, the corroded sacrificial anode 410 is removed as well. Thus, the sacrificial node protects the corrodible slider components 406 during processing, but will not create debris in the disk drive because it is removed.

Figure 7:
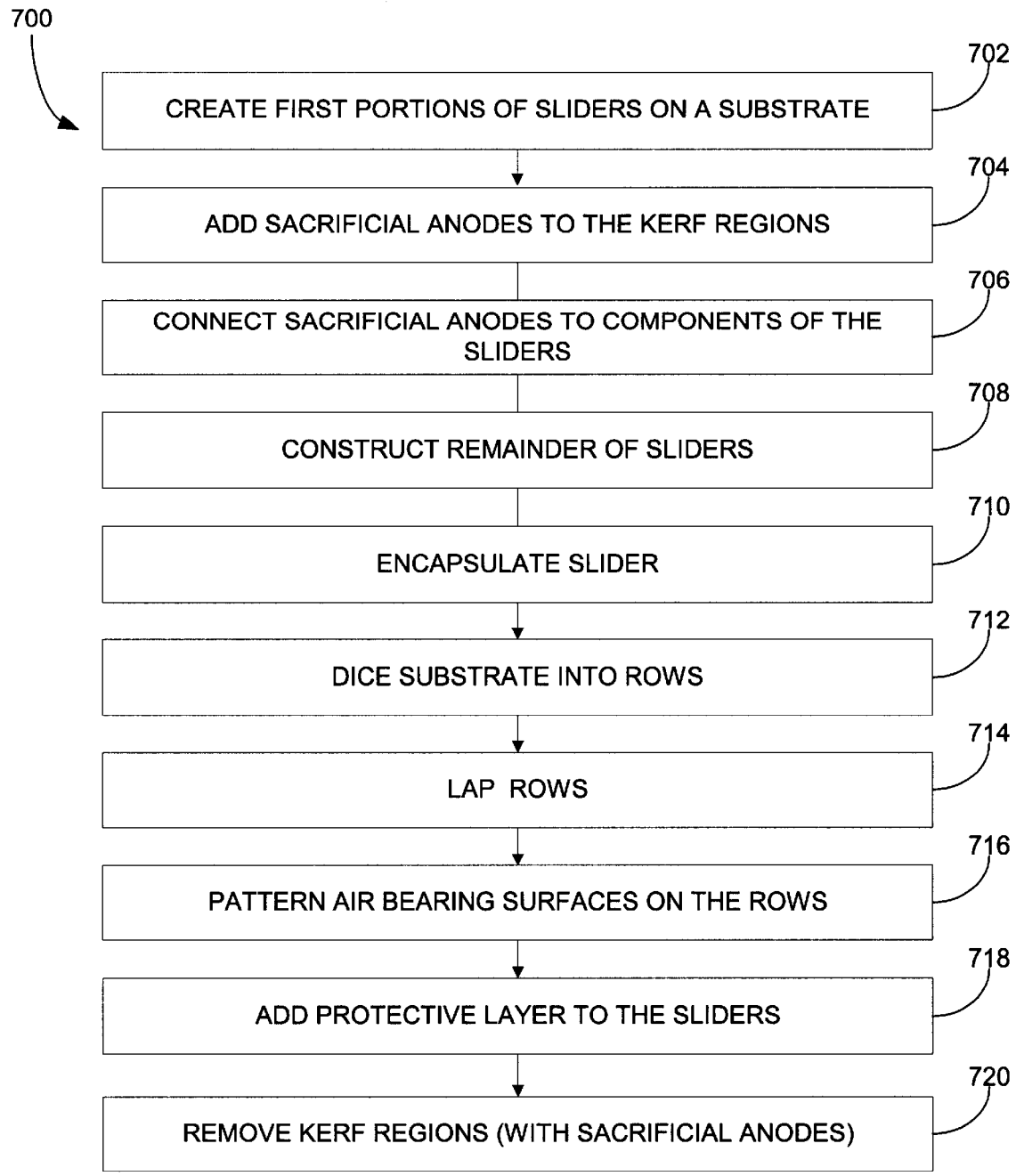
FIG. 7 depicts a process for fabricating a plurality of sliders according to an embodiment.

FIG. 7 depicts a process 700 for fabricating a plurality of sliders 100. First portions of the sliders 100 are created on a substrate 404 in step 702. The first portions may include, for example, an optional insulating layer component made of for example, alumina ($Al_2O_3$), deposited on a substrate 404 made of, for example, attic ($Al_2O_3$-TiC). The first portions also include a magnetic layer component made of, for example, Ferrite-Nickel (Ni-Fe) and/or Cobalt-Ferrite (CoFe). These materials are susceptible to corrosion.

Kerf regions 408 are defined between the sliders 100. In step 704, sacrificial anodes 410 are added to the kerf regions 408, such as by electrodeposition, sputtering, or any other suitable method. The sacrificial anodes 410 are exposed to an environment adjacent the sliders 100 (at least after lapping the rows to define air bearing surfaces). As mentioned above, illustrative materials from which to construct the sacrificial anodes 410 include aluminum, zinc, manganese, magnesium or alloys thereof.

In step 706, each sacrificial anode 410 is connected to a corrodible component 406 of an adjacent slider 100, such as the magnetic layer conponent 406 via a connector 414. This creates an electrochemical cell upon submersion of the slider 100 in a fluid, as the component 406 is or will be exposed to a corrosive environment during (further) processing. Note that steps 704 and 706 may be combined such that the connectors are formed while adding the sacrificial anodes 410 to the kerf regions 408. Note also that one sacrificial anode 410 may be connected to multiple components 406.

In step 708, a remainder of the slider 100 is constructed. For example, remaining layers of the sliders 100 can be added in step 708. Such layers can include non-magnetic intermediate layers constructed of, for example, magnetic copper. Pinned magnetic layers can also be provided, such as in the form of a thin Cobalt-Ferrite film. Antiferromagnetic layers of, for example, Palladium-Platinum-Manganese (PdPtMn), can be formed on the pinned magnetic layers. It should be noted, however, that the necessary components in carrying out the invention are the magnetic layer components 406. Other components are not necessarily needed.

In step 710, the slider 100 is exposed to a corrosive substance such as water. The substrate is diced into rows in step 712. The rows are lapped in step 714 to define air bearing surfaces. In step 716, air bearing surfaces are patterned on the rows. In step 718, a protective layer is added to each of the sliders 100 to prevent further corrosion and provide wear resistance. Preferably, the protective layer is a carbon-based layer.

In step 720, the kerf regions 408 are removed such as by sawing and/or laser cutting for slicing the sliders 100 from the rows, thereby forming individual sliders 100 for use in supporting the read/write heads in magnetic recording disk drives. The sacrificial anodes 410 are removed with the kerf regions 408.

When using sawing to remove the kerf regions 408, the width of each kerf region 408 is preferably about equal to a width of the saw blade.

According to an embodiment using laser cutting, a pulsed laser beam, for example, is directed to the kerf region 408 on the air bearing surface of the row (i.e., the sides of the sliders 100 that will face the disks in the disk drive). The laser beam scribes or partially cuts a generally V-shaped trench in the kerf region 408. One or more subsequent laser scans can be formed to cut completely through the wafer row to completely separate the sliders 100. The laser cutting process allows more sliders 100 to be formed from a single ceramic wafer since substantially less ceramic material is removed than would be removed if a diamond-tipped sawing process were used.

While various embodiments have been described above, it should be understood that they have been presented by way of example only, and not limitation. In particular, one skilled in the art will recognize that the structures and processes set forth herein can be adapted for use when fabricating any type of read/write head. Thus, the breadth and scope of a preferred embodiment should not be limited by any of the above-described exemplary embodiments, but should be defined only in accordance with the following claims and their equivalents.

What is claimed is:

1. A method for fabricating a slider, comprising:
   creating a first portion of a slider on a substrate, the first portion including a corrodible component of the slider, a kerf region being defined adjacent the slider;
   adding a sacrificial anode in the kerf region, the sacrificial anode being exposed to an environment adjacent the slider, the sacrificial anode being less noble than the corrodible component of the slider;
   connecting the sacrificial anode to the corrodible component of the slider;
   constructing a remainder of the slider;
   processing the slider; and
   removing the kerf region, the sacrificial anode being removed with the kerf region.

2. The method as recited in claim 1, and further comprising lapping the slider for defining an air bearing surface.

3. The method as recited in claim 1, wherein the sacrificial anode is constructed at least in part of at least one of aluminum, zinc, manganese, and magnesium.

4. The method as recited in claim 1, wherein the sacrificial anode is connected to the corrodible component of the slider via a connector, the connector being of a material different than the sacrificial anode.

5. The method as recited in claim 1, and further comprising adding a protective layer to the slider.

6. The method as recited in claim 1, wherein the kerf region is defined between aligned sliders.

7. The method as recited in claim 1, wherein the kerf region is removed via sawing.

8. The method as recited in claim 1, wherein the kerf region is removed via laser cutting.

9. A method for fabricating a plurality of sliders, comprising:
   creating first portions of sliders on a substrate, the first portions each including a corrodible component, kerf regions being defined between the sliders;
   adding sacrificial anodes to the kerf regions, the sacrificial anodes being exposed to an environment adjacent the sliders, wherein the sacrificial anodes are constructed at least in part of at least one of aluminum, zinc, manganese, and magnesium;
   connecting the sacrificial anodes to the corrodible components of the slider;
   constructing a remainder of each slider;
   exposing the sliders to a corrosive substance;
   dicing the substrate into rows;
   lapping the rows to define air bearing surfaces;
   patterning the air bearing surfaces on the rows;
   adding a protective layer to each of the sliders; and
   removing the kerf regions for slicing the sliders from the rows, the sacrificial anodes being removed with the kerf regions.

10. The method as recited in claim 9, wherein the kerf region is removed via sawing.

11. The method as recited in claim 9, wherein the kerf region is removed via laser cutting.

* * * * *